Figure 1:
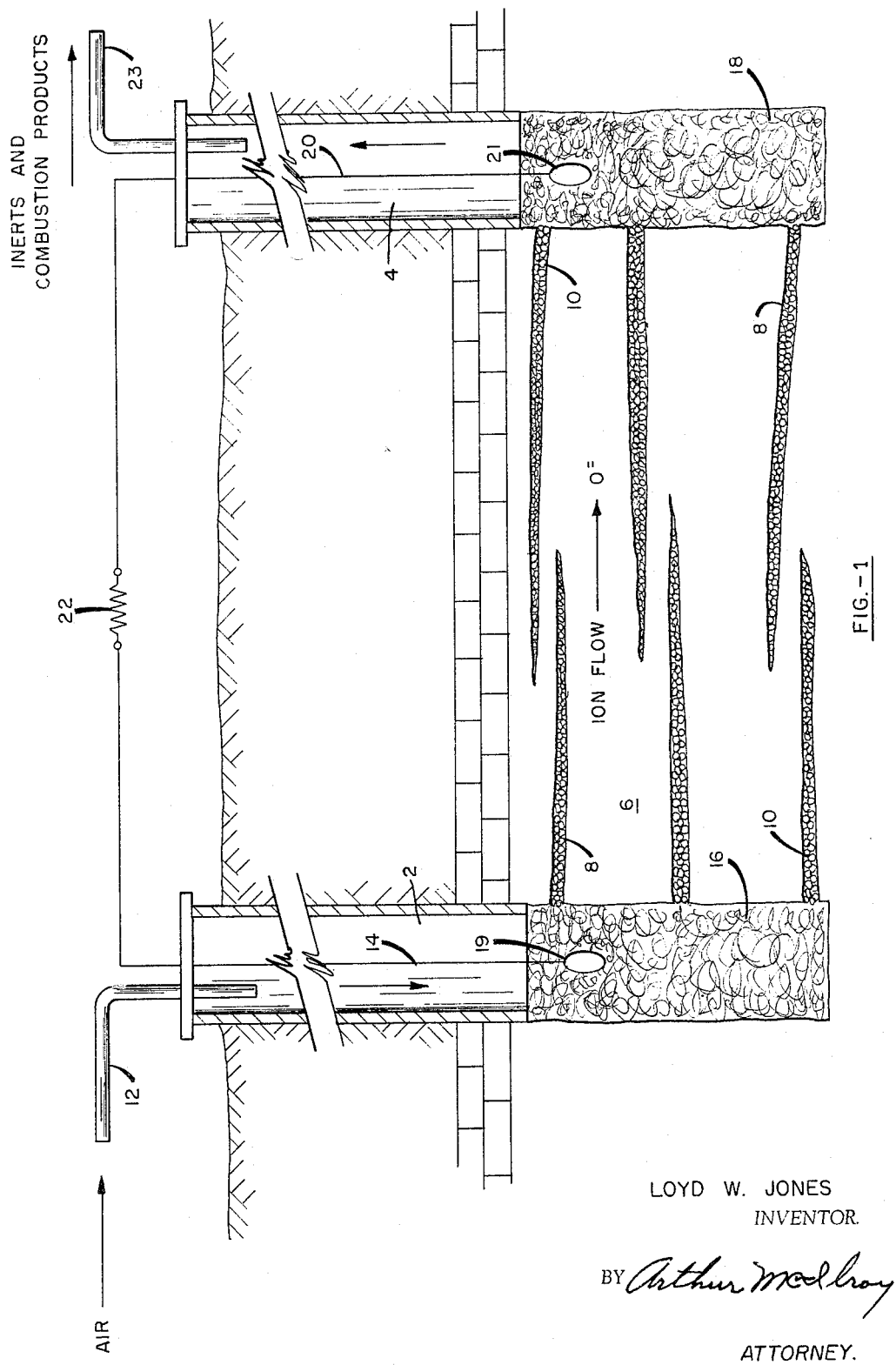

United States Patent Office 3,288,648
Patented Nov. 29, 1966

3,288,648
PROCESS FOR PRODUCING ELECTRICAL ENERGY FROM GEOLOGICAL LIQUID HYDROCARBON FORMATION
Loyd W. Jones, Tulsa, Okla., assignor to Pan American Petroleum Corporation, Tulsa, Okla., a corporation of Delaware
Filed Feb. 4, 1963, Ser. No. 255,912
8 Claims. (Cl. 136—86)

This is a continuation-in-part of my application Serial No. 115,951, filed June 9, 1962, now abandoned.

The present invention relates to fuel cells and the operation thereof. More particularly, it is concerned with a unique environment in which chemical energy of a fuel is converted into a direct current electrical energy.

The inherent simplicity of the fuel cell has made it a subject of long-standing interest. One of the intriguing features of such a power source is the directness with which it converts chemical energy into electrical energy. Because of this, fuel cells are potentially convenient, low-cost sources of electrical energy. Other factors which make the manufacture of electrical energy from such cells very attractive are their high efficiency, low fuel cost, low capital investment, low upkeep and long life.

Conventional fuel cells, as operated within the confines of man-made vessels, are inherently limited in practical size. This is especially true where the use of liquid hydrocarbons as fuel necessitates operation of the fuel cells at high temperatures. Further, the electrodes of usual fuel cells must be kept close together to minimize internal resistance through the electrolyte.

It is an object of my invention to provide a means for obtaining energy directly from hydrocarbons in earth formations. It is another object to provide a relatively simple, efficient means for recovering electrical energy from petroleum or other hydrocarbon materials left in a reservoir after waterflooding, reverse in situ combustion or other operations. It is a further object of my invention to provide a means of producing central station power by converting a hydrocarbon reservoir, or the equivalent, into a large fuel cell.

Briefly, my invention involves converting the chemical energy of hydrocarbons in a reservoir into electrical energy through the use of a fuel cell operated by oxidation of said hydrocarbons at the anode of said cell. An oil-bearing formation may be considered an anode where a reaction such as

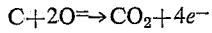

$$C + 2O^= \rightarrow CO_2 + 4e^-$$

can occur. By the use of above-ground conductors, I connect this formation to another formation (or another part of the same formation) which is being aerated to produce an oxygen concentration cell and causing current to flow through the conductors. An electrolyte connects the two formations (or two parts of the same formation) below the ground level.

The oil-bearing formation in which this oxidation occurs is in contact with cell electrodes which may be in the form of modified wells, at least one of which extends into said formation. Air, or preferably oxygen-enriched air, is introduced into the well serving as the cathode and, on contact with the latter, molecular oxygen is reduced to ionic oxygen. The creation of oxygen ions (reduction of oxygen) is spontaneous at the cathode surface when molecular oxygen is brought into contact therewith in the presence of an electrolyte and the cathode is connected to the anode by means of an external circuit. This cathode half cell reaction (reduction of oxygen) results spontaneously owing to the natural thermodynamic driving force. A source of electrons (fuel anode) and an electron acceptor (oxygen) are provided. Under these circumstances, electrons are supplied from the anode where electrochemical oxidation of hydrocarbons and simultaneous formation of electrons occur in the presence of electrolyte at the anode surface. These electrons are transferred through a surface resistance load to the cathode by means of the aforesaid external circuit. In the presence of these electrons and an electrolyte at the cathode surface, molecular oxygen is reduced to oxygen ions and the above cycle continued.

The cathode well of my earth fuel cell need not necessarily extend into the oil-bearing formation, although the well serving as the anode should be drilled into and be in contact with the hydrocarbon reservoir. The cathode well may, if conditions permit, be drilled into a salt, or similar, deposit. Flow of current from such a well through the earth to the anode, under these conditions, is readily established. More than one anode well may be connected to a single cathode well if said cathode well is sufficiently large under the particular conditions involved.

My studies indicate that direct migration of ionic oxygen from the cathode to the anode is not essential. The electrolyte solutions present in the earth formations contain vast quantities of ionic oxygen species, such as hydroxyl ions, capable of entering into oxidation-reduction reactions with oxidizable substances. An equivalent amount of positively charged ions exists so that electrical neutrality is maintained. When electrical energy, in the form of flowing electrons, is added or removed from the earth at one point, potential differences are established which produce electron flow at other points. The ionic species involved in the transfer of electrical energy between conductors buried in the earth is not always known, and may vary with the particular substances undergoing oxidation-reduction reactions. However, it is known that large electric currents flow between buried electrodes where oxidizing conditions exist at one electrode and reducing conditions exist at the other. This situation is the cause of corrosion of buried structures. The flow of electric current through the earth is utilized in the process known as cathodic protection, whereby buried structures are prevented from corroding by the use of sacrificial anode beds. In such cells the anodes and cathodes may be spaced several hundred feet apart and in different earth strata. In all these cases, of course, the earth strata are connected by natural electrolyte solutions.

Resistance to electric current flow between widely separated points in the earth strata is typically very low, say 0.1 ohm, due to the almost infinitely large cross-sectional area of the current path.

My invention may be further illustrated by reference to FIGURE 1 in which wells 2 and 4 are drilled into oil-bearing formation 6. Both wells are subjected to fracturing operations so as to establish, insofar as possible, fractures 8, filled, for example, with metal pellets or other suitable conductive material, thereby increasing the effective surface area of the electrodes. Owing to the fact that current flows readily through the earth from one electrode to another when a potential difference exists between them, the electrodes contemplated in the fuel cell of my invention may be much farther apart, for example 100 to 200 yards, than is ordinarily possible to extend a fracture out into the formation. An advantage of such wide spacing between electrodes is that direct migration of molecular oxygen from the cathode to the anode through the electrolyte filled rock pores is avoided. Actually, a cell of the kind covered by my invention may be assembled and operated without the use of fractures. However, use of fractures is a convenient means of establishing electrodes with very large surface areas. When fracturing, such step is preferably carried out with a low-penetrating liquid containing metal or metal-coated particles 10 as propping agents. These props may be in the form of metal shot made, for example, from copper, aluminum, alloys of these two metals, or alloys of aluminum or copper with other metals of sufficient strength and possessing relatively good conductivity. The common metal shot may be plated with a more noble metal such as silver, nickel or platinum.

Air introduced into well 2 via pipe 12 contacts metal cathode 16. On contact of molecular oxygen with cathode 16 in the presence of electrolyte, the oxygen is reduced and becomes negatively charged. Cathode 16 is connected to the external circuit via tubing or cable 14. The efficiency with which this reduction takes place, depends, to some extent, upon the cathode surface area contacted by the air stream and upon the quantity of oxygen present. Higher current densities can be produced with gases rich in oxygen. Nitrogen merely interferes with the reduction step by lowering the available cathode surface area which the oxygen can contact.

Any molecular oxygen escaping reduction at the cathode may diffuse into the rock formation with any inert gas. This free oxygen is capable of combining directly with hydrocarbons residing in the vicinity of the cathode, thus causing combustion with liberation of heat. While such direct oxidation of the hydrocarbon does not yield electrical energy, the heat created is useful in producing and maintaining a high temperature within the formation. As will be discussed later, high temperatures are desirable to promote electrochemical oxidation of the hydrocarbons at the anode. Further, the heat reduces viscosity of the oil and aids its movement to the anode for reaction.

If movement of residual gases from the cathode into the formation is undesirable, the gases and excess oxygen may be conducted out of well 2 by installation of additional piping within the well (by usual means). For example, pipe 12 could be extended to the bottom of the well for conducting air to that point. The air would percolate up past electrode 16 in contact with the electrolyte. Any residual or excess gas would flow back up the well casing outside pipe 12 and be discharged at the surface via an opening or conduit not shown.

Electrodes 16 and 18 in wells 2 and 4, respectively, may assume a number of different forms. For example, they may be composed of porous metal or metal wool with cables 14 and 20 affixed to their respective electrodes by fusion at 19 and 21, or by other appropriate means. Alternatively, the electrodes may be composed of metal turnings or shot. The surface afforded by such structures furnishes maximum contact of oxygen with the cathode to effect reduction in the presence of the electrolyte and also efficient contact of hydrocarbons at the anode so that the oxidation step may be carried out with optimum power output. Conductivity between the respective electrodes and the formation may be improved by introducing into the formation a sufficient quantity of a suitable electrolyte to extend between electrodes 16 and 18. This, of course, assumes that adequate dispersion or solution of the crude oil in the electrolyte exists, as may be accomplished in accordance with the description below.

Electrons released during the oxidation step are conducted from the cell via cable 20 to a suitable resistance load 22 while inert gases and gaseous oxidation products such as, for example, carbon monoxide and carbon dioxide, are removed from the system via pipe 23.

Figure 2:
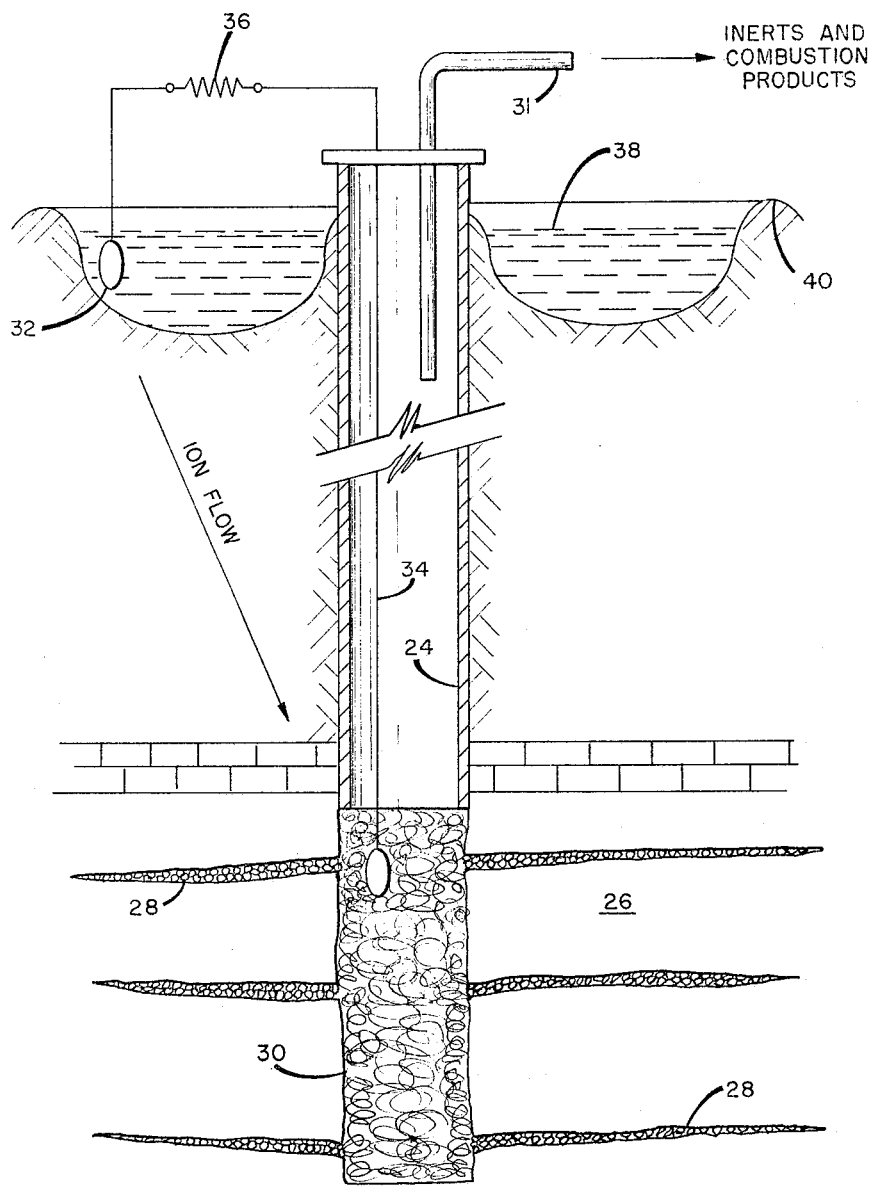

Alternatively, I need not use a two-well system but may employ an assembly such as is shown in FIGURE 2 wherein a well 24 extends into a producing zone 26 having fractures 28 opening into the uncased portion of the well. Anode 30 which is in contact both with liquid hydrocarbons and electrolyte is connected to cathode 32 via line 34 and resistance load 36. Cathode 32 preferably contacts an aqueous brine electrolyte 38 retained in a pool around well 24 by means of a levee or earth embankment 40. The formation of oxygen ions is spontaneous at the surface of cathode 32, as was explained above. By means of ionic conduction through the earth to anode 36, hydrocarbons, in contact with anode 30 and the electrolyte, are electrochemically oxidized, producing electrons, as generally indicated in the equation above. Inerts and oxidation products flow from the system via pipe 31. The electrons thus produced flow through conductor cable or line 34, resistance load 36 and then to cathode 32, thereby sustaining the process of reducing molecular oxygen to the ionic form. As in the system shown in FIGURE 1, fractures 28 may contain conductive metal props.

To insure proper contact of the liquid hydrocarbons with the anode so that maximum efficiency of the oxidation reaction in the presence of an electrolyte can be realized, I have used a relatively small amount of an emulsifier, e.g., 0.1 to about 5.0 percent, based on the oil present. Any of a large group of surface-active agents capable of emulsifying crude oil in salt brine is satisfactory. The particular emulsifier used is the reaction product of 4 moles of ethylene oxide and 1 mole of lauryl alcohol. Instead of using an emulsifier, or to supplement the latter, I may add to the well bore containing the anode certain organic solvents, such as the water- and oil-soluble alcohols, ketones, etc. As examples of these solvents there may be mentioned isopropyl alcohol, butanol, the glycol ethers, methyl ethyl ketone and mixtures of these materials. In this way, the availability of the crude hydrocarbons for electrochemical oxidation is increased. In some formations crude petroleum emerges from the rock in the form of an aqueous emulsion. In such instances, the hydrocarbons may be electrochemically oxidized without the addition of an emulsifier, or reaction conditions may be improved by the addition of a water and oil solvent to the well bore in which the anode is located.

A convenient method of obtaining dispersion of oil into the electrolyte by means of emulsifiers or solvents is to inject the solvents or solutions of the emulsifiers into the formation from well 2, whereby a mixture of solvent or emulsifier, electrolyte and oil is caused to flow into contact with the electrode in well 4, thus providing optimum conditions for electrochemical oxidation.

In the experimental work referred to immediately above, I employed bright platinum electrodes both of which were immersed in a saturated sodium sulfate brine having a pH of about 3.9. The cathode was bathed in oxygen and was connected to the main cell via a salt water bridge. The hydrocarbon source used in this work was a crude oil obtained from the Cha Cha Gallup Field, New Mexico. Actual electrochemical oxidation of the hydrocarbons was achieved at 90° C. The system operated as a fuel cell under these conditions producing a voltage of 0.127 to 0.142 volt. Only a relatively low current resulted due to an extremely high cell resistance of about $5 \times 10^6$ ohms. Earth formations generally exhibit much lower resistance even when the electrodes are several hundred feet apart. The tests do, however, demonstrate the principle that crude oil can be used as a fuel cell fuel.

While the electrodes I have employed were made of platinum, they may also be constructed of indium, titanium, palladium, rhodium and other noble metals, as well as raney nickel. To increase the active surface area of these electrodes, they may be made into a finely divided metal which has been compacted with a conducting substrate such as, for example, graphite. Powdery deposits on electrodes such as platinizing, palladizing, etc., may also be employed to increase the surface area.

As pointed out above, the electrodes, and especially the part of the electrodes extending out into the fractures, may be constructed of common metal over which the more noble metals are plated. Even non-conducting particles such as sand could be made conductive by coating with a thin metal layer. With formation brines of high chloride content, platinum electrodes should not be used because of their tendency to dissolve therein under fuel cell operating conditions. In cases of this sort, electrodes of titanium or rhodium are usually preferred.

If it appears that a given hydrocarbon reservoir cannot be made to power a fuel cell in accordance with my invention at temperatures in the relatively low range of 80° C. to 100° C., the temperature at the anode should be increased, e.g. up to about 400° C. or 500° C. At these temperatures, aqueous electrolytes, of course, become impractical at bottom hole well conditions and fused inorganic carbonates should be employed such as, for example, a molten eutectic of alkali metal carbonates. Thin wafers of certain mixed oxides, such as zirconium and calcium oxides become conductive at temperatures of 980° C. and are of distinct advantage in operation of high-temperature hydrocarbon fuel fells. Some earth formations are expected to increase in conductivity at these temperatures also. At temperatures of, say, from those where hydrocarbon vapors first begin to form in appreciable amounts, e.g. 200° to 300° C. up to temperatures of the order of 900° to 1000° C., the hydrocarbons can be moved through the rock as a vapor in which form they are readily available for reaction at the anode in the presence of a hot electrolyte. Partial oxidation or decomposition products such as carbon monoxide or hydrogen, such as might be formed by steam reformation at the high temperatures, will also react readily at the anode to produce current. Intermediate temperatures, i.e., 200° to 300° C., may be employed to enhance mixing or dispersion of the hydrocarbon in the electrolyte.

To obtain a reasonably rapid rate of reaction, it is generally preferred that the formation should be at a temperature of at least about 100° to 200° C. Higher temperatures are governed by the effect they have on the hydrocarbons and on the efficiency of the cell. Such temperatures should exist in the vicinity of the anode and may be maintained by the cell reaction itself, once operation thereof is under way. Initially, these temperatures may be generated by conducting a limited combustion process in known manner in each well, whereby a portion of the hydrocarbons in the formation is burned. However, once the desired temperature is established, the cathode and anode components are installed and the cell reaction begun. The surrounding formation, being a good heat insulator, serves to maintain the system at the desired temperature level. One of the outstanding advantages of my subsurface fuel cell is that very high temperatures and pressures can be generated and maintained in the large volumes of space available in rock interstices. Because of this fact, it will be appreciated that the oil being electrochemically oxidized need not be derived from the particular formation penetrated by the well in which the anode is present. It may be desirable, owing to the natural insulating and favorable conductive characteristics of the earth, to add from an external source the oil required to sustain operation of such a fuel cell. Likewise, this same principle can be applied to situations where hydrocarbons are stored in an underground cavity such as, for example, a mined shale, limestone or salt cavern. The anode of such a cell could be placed in contact with the hydrocarbons and electrolyte, heat added to the system, at least to initiate the reaction, and oxidation at the anode effected in accordance with the present invention. This would mean that the cathode may or may not be located at the ground surface, as previously described.

The single cell installation, as described herein, can be expected to produce large amounts of current with a potential difference between the wells of up to about 1.0 volt. Higher voltages can be obtained by connecting several cells in series. To avoid interference between cells, it is necessary that the distance between the cells be of the order of ten times, or more, the distance between the paired electrodes in the individual cells.

I claim:

1. A process for the direct conversion of hydrocarbons into electrical energy which comprises extending an electrode into each of two spaced wells, one of said wells penetrating an ionically conductive geological liquid hydrocarbon-containing formation, the electrode in said one of said wells being placed opposite said formation and in contact with both liquid hydrocarbon and an electrolyte which, in turn, contacts said formation, connecting said electrodes to one another by means of an external circuit, bringing an oxygen-containing gas in contact with the other of said electrodes which is also in contact with an electrolyte whereby oxygen ions are spontaneously produced at said other electrode thus establishing a potential difference in said formation between said electrodes, thereafter effecting electrochemical oxidation of said hydrocarbons at the surface of said one of said electrodes in the presence of said electrolyte to produce electrons, and recovering electrical energy thus formed via said one of said electrodes.

2. A process for the direct conversion of hydrocarbons into electrical energy which comprises extending an electrode into each of two spaced wells penetrating an ionically conductive geological formation, one of said electrodes being placed opposite said formation and in contact with hydrocarbons and with an electrolyte, said electrolyte in turn contacting said formation, connecting said electrodes to one another by means of an external circuit, bringing an oxygen-containing gas in contact with the other of said electrodes which is also in contact with an electrolyte whereby oxygen ions are spontaneously produced at said other electrode thus establishing a potential difference in said formation between said electrodes, thereafter effecting electrochemical oxidation of said hydrocarbons at the surface of said one of said electrodes in the presence of said electrolyte to produce electrons, and recovering electrical energy thus formed via said one of said electrodes.

3. The process of claim 1 in which an aqueous electrolyte is employed, the hydrocarbons are in the form of an aqueous emulsion in said electrolyte, and the temperature to which said emulsion is subjected is about 100° C.

4. The process of claim 1 in which the hydrocarbons present in said formation and in said well where electrochemical oxidation occurs are in the form of an aqueous emulsion.

5. The process of claim 1 wherein said electrolyte is in the form of a molten inorganic carbonate.

6. The process of claim 5 in which the inorganic carbonate is an alkali metal carbonate.

7. The process of claim 1 in which the electrolyte in contact with said one of said electrodes is in the form of a molten eutectic of alkali metal carbonates.

8. The process of claim 1 in which an aqueous electrolyte is employed and the hydrocarbons are at least partially dissolved therein by means of a water-soluble oxygenated organic solvent.

References Cited by the Examiner

UNITED STATES PATENTS

| | | | |
|---|---|---|---|
| 690,151 | 12/1901 | Jahr | 136—85 |
| 728,381 | 5/1903 | Emme | 136—85 |
| 2,344,672 | 3/1944 | Blasier | 136—85 |
| 2,384,463 | 9/1945 | Gunn et al. | 136—86 |
| 2,495,466 | 1/1950 | Miller | 136—85 |
| 2,818,118 | 12/1957 | Dixon | 166—65 X |
| 2,925,454 | 2/1960 | Justi et al. | 136—86 |
| 2,928,783 | 3/1960 | Bacon | 136—256 X |

FOREIGN PATENTS 17,402 A.D. 1905 Great Britain.

WINSTON A. DOUGLAS, *Primary Examiner.*

JOHN H. MACK, ALLEN B. CURTIS, *Examiners.*

H. FEELEY, *Assistant Examiner.*